INVENTOR
Carl W. Chanlund
BY Bacon & Thomas
ATTORNEYS

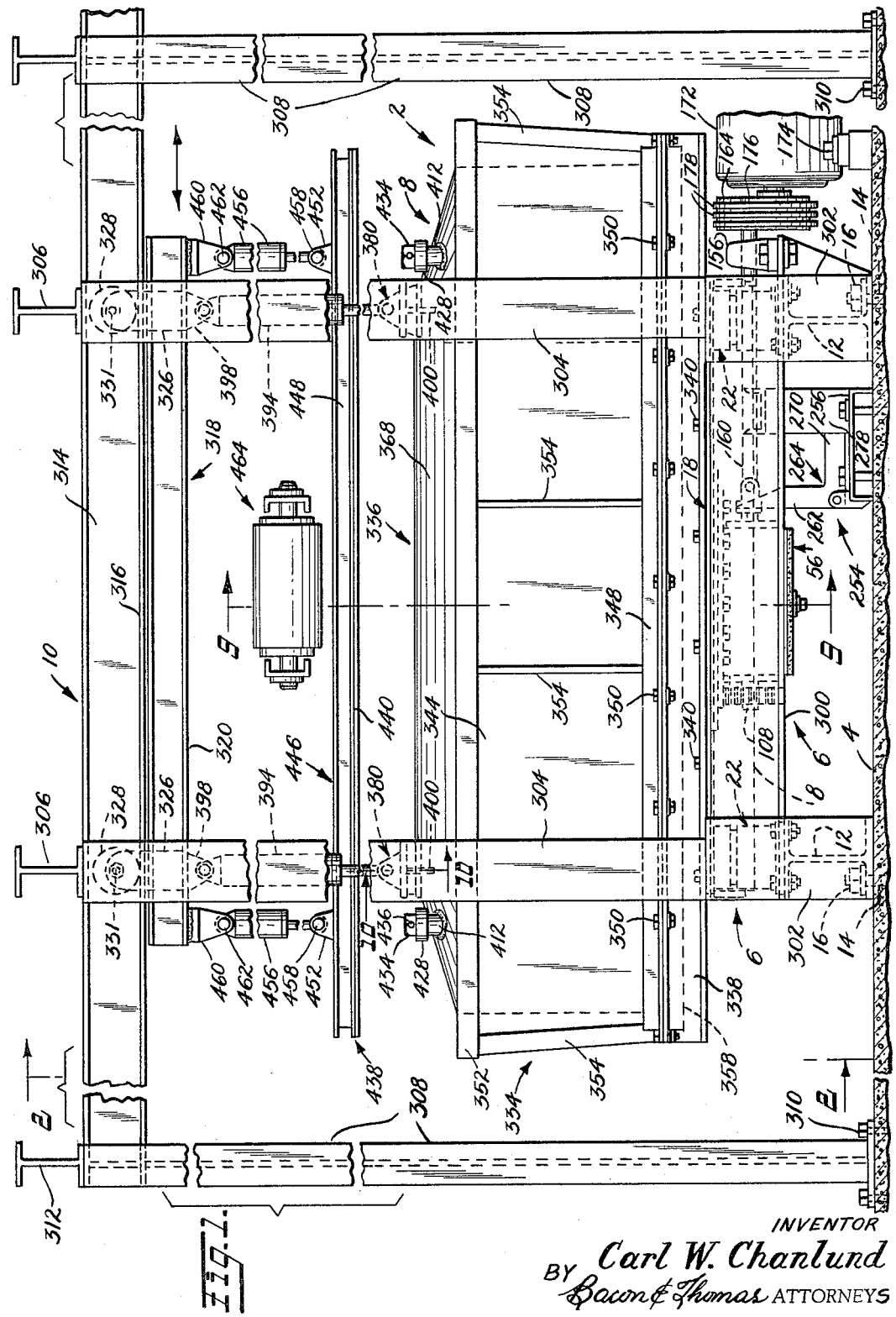

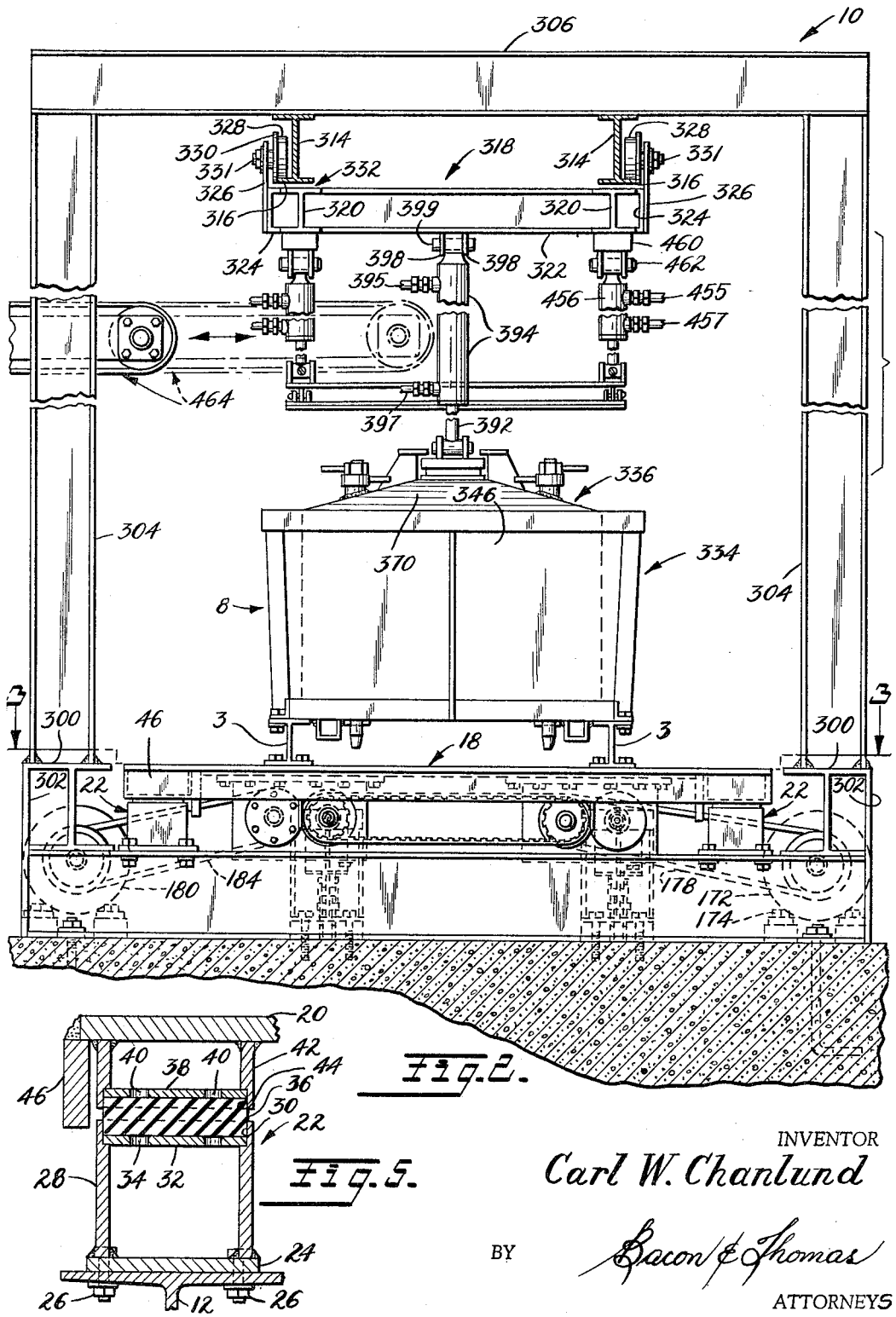

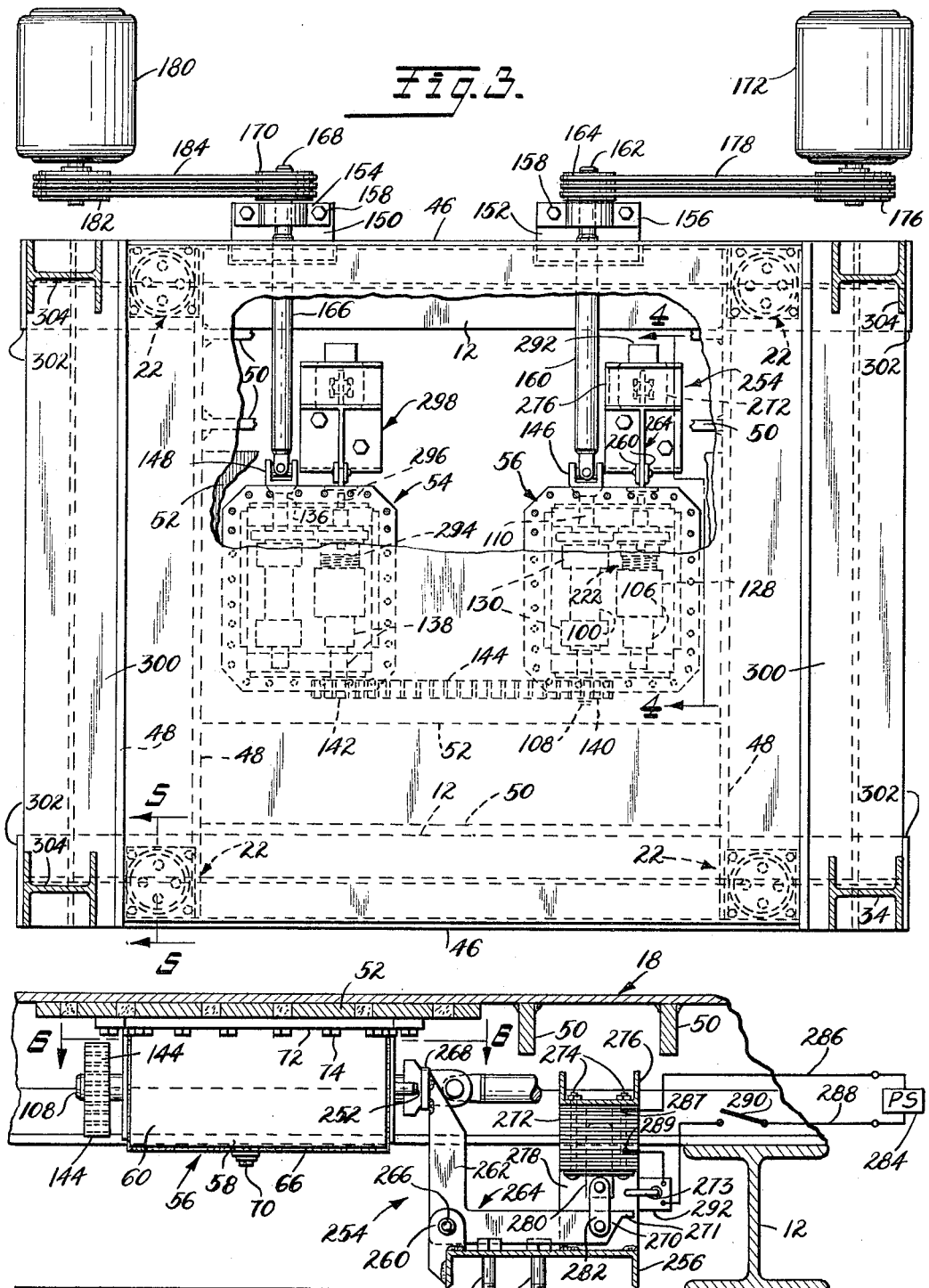

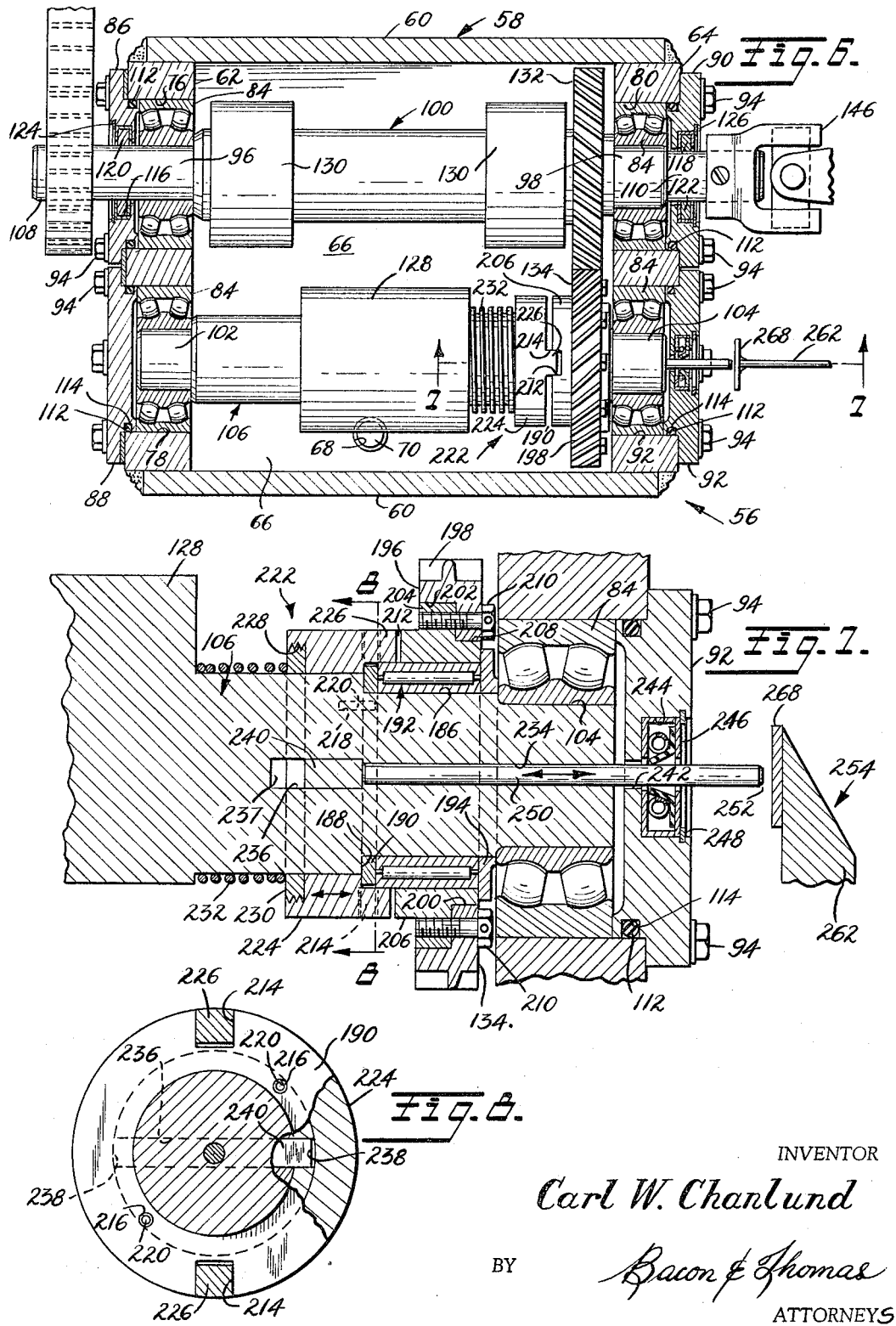

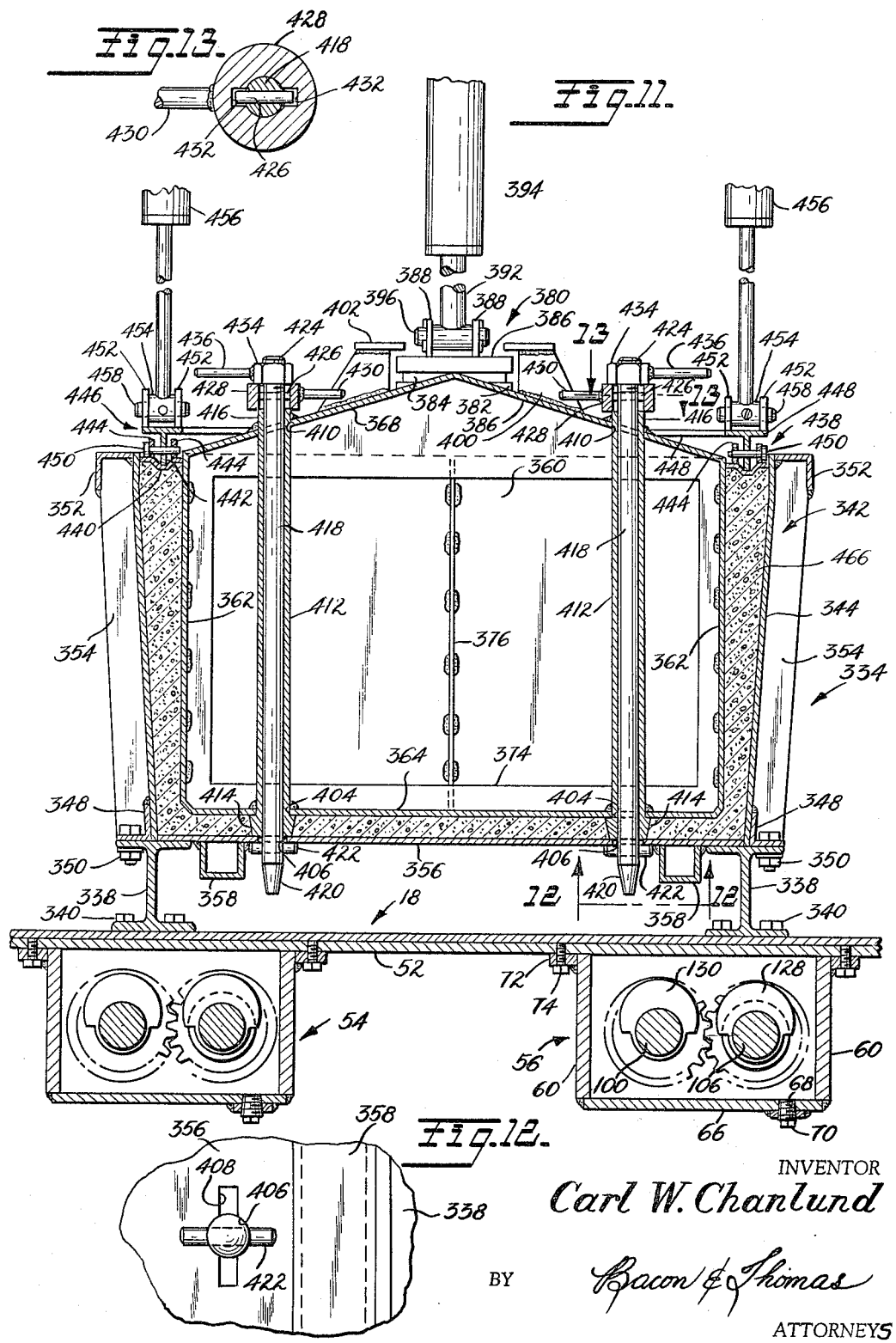

United States Patent Office 3,273,217
Patented Sept. 20, 1966

1

3,273,217
MOLDING APPARATUS INCLUDING A VIBRATION TABLE WITH SELECTIVE HORIZONTAL AND VERTICAL MOTION
Carl Wilmer Chanlund, Nampa, Idaho, assignor to Idaho Concrete Pipe Co., Nampa, Idaho, a corporation of Idaho
Filed June 11, 1965, Ser. No. 463,202
16 Claims. (Cl. 25—41)

This invention relates generally to apparatus for molding concrete products and the like, and more particularly to an improved apparatus incorporating a unique vibration table for a mold designed to be selectively vibrated in either a horizontal or a vertical direction, and to change from one direction of vibration to another while the vibration table is in operation.

The apparatus can be utilized to produce innumerable kinds of molded concrete products, depending upon the configuration of the mold being utilized. Likewise, the apparatus can be used for purposes other than vibrating a mold. However, by way of example, in practicing the invention, a mold for receiving a concrete mixture is disposed to rest upon and is clamped to a novel vibration table. The vibration table is supported upon a plurality of resilient cushioned legs, and the clamping means for securing the mold to the table also incorporates a resilient cushion. The vibration table is constructed to vibrate the mold to facilitate even distribution of the concrete mixture and to compact the mixture into a homogeneous mass, for producing a properly shaped, dense, voidless concrete product.

The vibration table, which as has been stated, is mounted upon resilient cushioned legs, has at least one vibrator unit secured thereto, and in the preferred embodiment incorporates a plurality of vibrator units interconnected for synchronous operation. Each vibrator unit includes a pair of parallel shafts having eccentric weights thereon, the shafts being coupled by a pair of helical gears to rotate in opposite directions at identical speeds for producing vibratory motion. One of the helical gears is fixed to a first one of the shafts, and the other helical gear is rotatably mounted on the second vibrator shaft. A clutch mechanism is also mounted on the second vibrator shaft, and is operable to fix the second helical gear to said shaft for rotation therewith. The relative radial orientation of the eccentric weights on their respective shafts can be varied by operating the clutch mechanism to temporarily free the second shaft from the second helical gear, after which the two shafts can be rotated relative to each other to change the relative radial positions of the weights and driving engagement re-established. A different direction of vibration is produced by the vibrator unit for each change in relative radial position of the eccentric weights.

The vibrator unit of the preferred embodiment is designed to selectively produce vibrations in either a vertical or a horizontal direction, and the clutch mechanism is designed to be maniuplated while the vibrator unit is operating to switch from vertical vibration to horizontal vibration, and vice versa. During the filling of the mold with concrete mixture, the vibrator units are normally set to impart rapid horizontal vibrations to the vibration table, which vibrations function to distribute the mixture uniformly throughout the mold. When filling of the mold has been completed, the clutch mechanism is operated to change the vibrator units from a horizontal mode to a vertical mode, and thereafter the resultant vertical vibrations settle and compact the concrete mixture within the mold.

The present apparatus also includes a framework extending above the vibration table, from which a pressure-applying device is suspended by a hydraulic jack arrangement. The pressure device is disposed to be received within the mold, and to press downwardly upon the concrete mixture contained therein, while the vibration table is in operation. The action of the pressure device thus cooperates with the vibratory movements of the vibration table to compact the concrete mixture.

It is an object of this invention to provide a vibration table constructed to provide controlled vibrations in a plurality of directions, and to be operable while the vibration table is in operation to change from one direction or mode of vibration to another direction or mode.

Another object is to provide a concrete molding apparatus constructed to produce molded concrete products having a smooth exterior surface and a compacted, voidless internal wall structure.

It is also an object to provide a vibrator unit of general application, constructed to provide controlled vibrations in any selected one of a plurality of directions, and which is operable, while the vibrator unit is in operation, to change from one direction of vibration to another.

Still another object is to provide a vibration table incorporating a plurality of vibrator units of the type described, interconnected for synchronous operation.

It is also an object to provide a concrete molding apparatus incorporating a vibration table and a mold structure, constructed so that the mold structure is, in effect, clamped between resilient cushions while it is being vibrated by the vibration table.

Other objects and many of the attendant advantages of the present invention will become readily apparent from the following description, when taken in conjunction with the accompanying drawings, wherein:

FIG. 1 is a side elevational view of the concrete molding apparatus, with a work transfer carrier shown positioned over the mold and vibration table;

FIG. 2 is a vertical sectional view of the apparatus of FIG. 1, taken along the line 2—2 of FIG. 1;

FIG. 3 is a horizontal sectional view, partially broken away, taken along the line 3—3 of FIG. 2, and showing the construction of the vibration table;

FIG. 4 is a fragmentary vertical sectional view, taken along the line 4—4 of FIG. 3, showing one of the vibrator units and a solenoid-operated mechanism for operating a clutch mechanism associated therewith;

FIG. 5 is an enlarged, vertical sectional view, taken along the line 5—5 of FIG. 3, showing the construction of one of the resilient cushion legs which supports the vibration table;

FIG. 6 is an enlarged horizontal sectional view, taken along the line 6—6 of FIG. 4, showing the construction of one of the vibrator units;

FIG. 7 is an enlarged fragmentary vertical sectional view, taken along the line 7—7 of FIG. 6, showing the details of the clutch mechanism;

FIG. 8 is a vertical section view through the clutch, with portions broken away, taken along the line 8—8 of FIG. 7;

FIG. 11 is an enlarged fragmentary vertical sectional view similar to FIG. 9, but showing the vibrator units arranged to impart vertical motion to the vibration table and the mold disposed thereon;

FIG. 12 is an enlarged fragmentary detail view of a mold locking pin arrangement as viewed along the line 12—12 of FIG. 11; and FIG. 13 is an enlarged horizontal sectional view through a locking rod pin, taken along the line 13—13 of FIG. 11.

Figure 9:
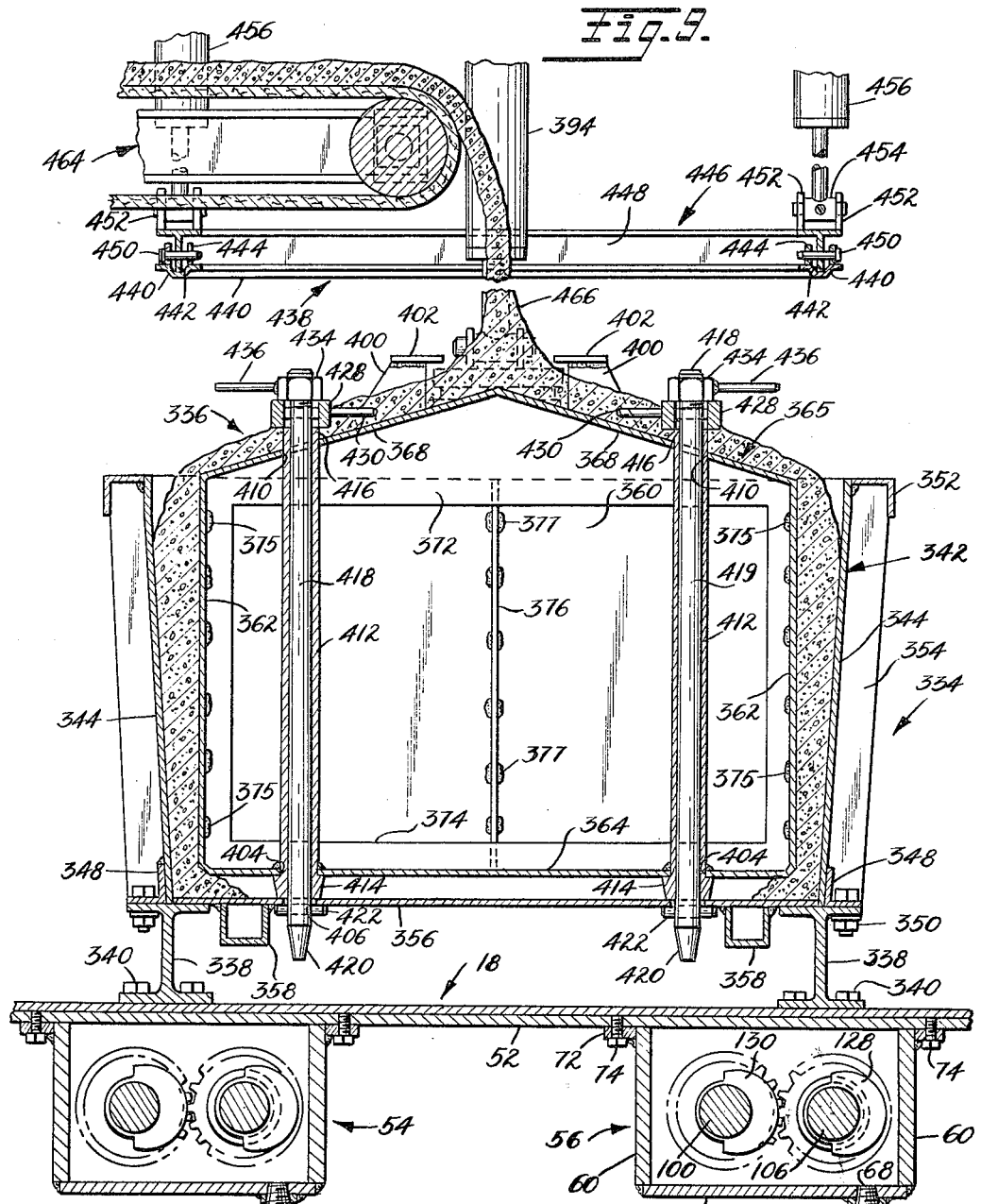
FIG. 9 is an enlarged fragmentary vertical sectional view, taken on the line 9—9 of FIG. 1, showing the two vibrator units arranged to impart horizontal vibration motion to the vibration table and the mold, the mold being shown while filling thereof is in progress.

The illustrated apparatus can be utilized, with mold changes, to construct concrete products of many different sizes and configurations. For the purposes of indicating utility, the apparatus will be described with respect to the making of the receptacle portion of a concrete burial vault. However, it is to be understood that the invention is not to be limited to the manufacture of such a product.

Referring now to the drawings, the molding apparatus is indicated generally at 2 in FIG. 1 and normally will rest upon a concrete floor 4. The apparatus 2 includes a vibration table 6 for supporting a mold 8, and a framework 10 extending above the vibration table and having means arranged to facilitate transport of the molded product and the mold, and to exert pressure on the concrete mixture during the molding process, as will be explained more fully hereinafter.

The vibration table 6 has a base comprising a pair of spaced, parallel I-beams 12 secured to the floor 4 by anchor bolts 14 and nuts 16, the lower ends of the anchor bolts 14 being embedded in the floor. A table platform 18 is disposed over the I-beams 12, and includes a rectangular plate supported at each of its four corners by a cushioned leg 22.

The cushioned legs 22 are identical in construction, and the details of one is shown in FIG. 5. Thus, each cushioned leg 22 has a base 24, which is secured to the upper flange of an I-beam 12 by bolts 26. Resting upon the base 24 and welded thereto is the lower end of a vertically disposed lower cylinder 28 having an axially extending socket 30 in its upper end. Received within the socket 30 is a cushion-supporting disc 32 having a plurality of holes 34 extending therethrough. The upper edge around each hole 34 is rounded to prevent damage to a cushion 36 supported by the disc 32. The cushion 36 is preferably made of gum rubber, or the like, and has a thickness of at least 1 inch.

An upper disc 38 is engaged with the top face of the cushion 36, and has a plurality of holes 40 extending therethrough, the lower edge of each being rounded. An upper cylinder 42 has a socket 44 in its lower end, and the disc 38 and the upper portion of the cushion 36 are received within said socket. The upper end of the cylinder 42 is welded to the undersurface of the table platform 18.

The four cushioned legs 22, as has been stated, are constructed in an identical manner, and function to permit the table platform 18 to vibrate in substantially any direction relative to its supporting I-beams 12. The rubber cushions 36 absorb the vibration shocks and portions thereof can expand into the holes 34 and 40 to facilitate such absorption. The cushions 36 are designed to have a thickness sufficient to prevent the two confronting ends of the cylinders 28 from contacting regardless of the direction of vibration of the table platform 18.

The table platform 18 of the vibration table 6 has lateral reinforcing ribs 46, FIG. 3, secured thereto, which project downwardly from its lateral edges, and are parallel to the I-beams 12. Ribs 48 extend between the lateral ribs 46, and are positioned inwardly of the cushioned legs 22. Spaced, parallel secondary ribs 50 extend between the ribs 48, and function to add further rigidity to the table platform 18. Welded centrally of the platform 18 and positioned between the ribs 48, is a vibrator mounting plate 52, to which is secured a pair of vibrator units 54 and 56, FIG. 11.

The vibrator units 54 and 56 are substantially identical in construction, and hence only the vibrator unit 56, FIGS. 4, 6, 7 and 11, will be described in detail. The vibrator unit 56 includes a housing 58, comprising a pair of side walls 60, a pair of end walls 62 and 64, and a bottom wall 66. The side, end, and bottom walls 60, 62, 64 and 66, respectively, are welded together to form the housing 58. The bottom wall 66 has a threaded opening 68 therein for the reception of an oil drain plug 70. A peripheral flange 72 extends about the upper end of the housing 58, and is secured to the mounting plate 52 by bolts 74.

The end wall 62 has a pair of openings 76 and 78 extending therethrough, which are aligned with a similar pair of openings 80 and 82, respectively, in the end wall 64. Bearings 84 are received within each of the openings 76, 78, 80 and 82, and cover plates 86, 88, 90 and 92, respectively, are secured over said openings by bolts 94.

Received within the bearings 84 in the aligned openings 76 and 80 are the opposite ends 96 and 98 of a shaft 100. The opposite ends 102 and 104 of a second shaft 106 are received within the bearings 84 in the aligned openings 78 and 82. The shaft 100 includes extensions 108 and 110 on its opposite ends 96 and 98, respectively.

Each of the cover plates 86, 88, 90 and 92 includes a cylindrical boss, which is receivable within its respective opening 76, 78, 80 or 82, said bosses each having an O-ring seal 112 contained in a peripheral groove 114. The cover plates 86 and 90 have counterbored openings 116 and 118 extending therethrough for the reception of the shaft extensions 108 and 110, and seals 120 and 122 are secured within the counterboard portions by snap rings 124 and 126, respectively.

The shaft 106 has a centrally positioned eccentric mass or weight 128 formed integrally therewith and a generally arcuate configuration, as is best shown in FIGS. 9 and 11. The shaft 100 has a pair of identical eccentric weights 130 thereon, one positioned at each end thereof beyond the axial end faces of the weight 128. The two weights 130 have a cross-sectional configuration identical to that of the eccentric weight 128, and have a combined axial length corresponding to that of the eccentric weight 128; thus, the mass of the eccentric weight 128 is identical to the combined masses of the weights 130, and hence the shafts 100 and 106 will generate identical eccentric forces when rotated at identical speeds.

The shaft 100 has a helical gear 132 fixedly mounted thereon adjacent the reduced end 98 thereof, which meshes with a gear 134. The gear 134 is carried on the shaft 106 and is associated with a clutch device for drivingly connecting it to said shaft, as will be described later. The gears 132 and 134 are identical in pitch diameter and in the number of teeth thereon, and when the gear 134 is drivingly secured to rotate with the shaft 106, the two shafts 100 and 106 will rotate in opposite directions at identical speeds.

The vibrator 54 is substantially identical in construction to the vibrator 56, and includes a pair of shafts having oppositely extending ends 136 and 138 (FIG. 3). Secured to the shaft ends 108 and 138, of the vibrators 56 and 54, respectively, are sprockets 140 and 142, respectively. A toothed, flexible endless belt 144 interconnects said two sprockets. The extension 110 on the shaft 100 has one end of a universal coupling 146 secured thereto, and the shaft end 136 of the vibrator 54 has one end of a universal coupling 148 attached thereto.

Brackets 150 and 152, FIG. 3, are welded to the outer side of one of the I-beams 12 in spaced relation to the shaft ends 136 and 110, respectively. Pillow block bearings 154 and 156 are secured to the respective brackets 150 and 152 by bolts 158. A torque tube 160 is secured at one end thereof to the universal coupling 146, and has its other end telescoped over and welded to a stub shaft 162 received within the bearing 156. A multigroove pulley 164 is mounted on the stub shaft 162. Similarly, a torque tube 166 is connected to the universal coupling 148, and is connected to a stub shaft 168 extending through bearing 154 and has a multi-groove pulley 170 mounted thereon.

An electric motor 172 is secured to the floor 4 by bolts 174, with a pulley 176 on the shaft thereof in alignment with the pulley 164; a plurality of endless belts 178 drivingly interconnect the pulleys 176 and 164. A motor 180 is similarly secured to the floor 4 with its pulley 182 in alignment with the pulley 170. The pulleys 170 and 182 are drivingly interconnected by a plurality of belts 184. The electric motors 172 and 180 thus operate to effect rotation of the shafts of their respective vibrator units 54 and 56, and the sprockets 140 and 142 and their belts 144 maintain the two separate vibrator units 54 and 56 in synchronous operation, whereby to impart vibrations to the table platform 18, in a preselected direction.

The vibrator units 54 and 56 are thus interconnected for synchronous operation, and can be arranged to vibrate the table platform 18 in either a horizontal or a vertical direction, depending on the relative radial positions of the weights 120 and 130. The vibrator units 54 and 56 are designed to be operable while the vibration table 6 is in operation to change from a vertical vibration mode to a horizontal vibration mode, and vice versa.

Referring to FIG. 9, the vibrator units 54 and 56 are shown with their weights arranged to produce horizontal vibration of the table platform 18. The shafts 100 and 106 are, of course, operable to rotate together toward each other since they are coupled by the helical gears 132 and 134. The weights 128 and 130 are arranged relative to each other so that as the shafts 100 and 106 rotate, the centers of mass of said weights will both be directed horizontally in the same direction at the same instant in time, as shown in FIG. 9 and their inertia will tend to move the table platform 18 in a corresponding direction. With the weights 128 and 130 thus arranged, it is apparent that when their respective shafts are rotated 90° in opposite directions from the positions shown in FIG. 9, radial lines through the centers of mass of the weights 128 and 130 will extend in opposite vertical directions, and the inertia effect of said weights will cancel each other. It is thus seen that when the shafts 100 and 106 are rotated at identical speeds in opposite directions the result will be substantially pure horizontal vibrations, the intensity of which can be varied by varying the speed at which the shafts 100 and 106 rotate.

To impart vertical vibrations to the table platform 18, the relative positions of the weights 128 and 130 are changed so that radial lines through the centers of masses thereof will all point in the same vertical direction at the same instant in time, while pointing in opposite horizontal directions at another instant in time. This will result in substantially pure vertical vibration of the platform table 18 when the shafts 100 and 106 are rotated. To change the mode of vibration from horizontal, as in FIG. 9, to vertical, as in FIG. 11, all that is necessary is to rotate the shaft 106 so that it is 180 degrees out of phase with the shaft 100, as will be readily understood by an examination of FIGS. 9 and 11. The structure whereby the relative radial positions of the shafts 100 and 106 can thus be changed from one mode to another, while the vibration table 6 is in operation, will now be described.

Referring in particular to FIG. 7, the shaft 106 has an intermediate diameter portion 186 positioned inwardly of the reduced portion 104 thereof, and which terminates at its inner end in a shoulder 188. An inner thrust washer 190 is received on the shaft portion 186, and engages the shoulder 188. A needle roller bearing 192 is also received on the shaft portion 186, and an outer thrust washer 194 is disposed between said bearing 192 and the bearing 84.

The helical gear 134 is in the form of an annulus 196 having gear teeth 198 formed on the outer periphery thereof. The annulus 196 has an opening 200 with a counterbore 202 in the inner face thereof, within which is received a flange 204 of a generally cylindrical hub 206. The hub 206 also includes a reduced diameter portion 208, receivable within the cylindrical opening 200, and the inner diameter of said hub portion is sized to be received on the needle bearing 192. The annulus 196 is secured to the flange 204 of the hub 206 by cap screws 210.

The inner end of the cylindrical hub 206 has a pair of diametrically opposed notches 212 therein, which are aligned with notches 214, identical in width and depth, in the inner thrust washer 190. The inner thrust washer 190 has a pair of diametrically opposed bores 216, FIG. 8, therein displaced circumferentially from the notches 214, and positioned to confront bores 218 in the shoulder 188 of the shaft 106. Pins 220 are received within the aligned bores 216 and 218, and key the inner thrust washer 190 to rotate with the shaft 106. It is thus seen that the gear 134 is rotatably mounted on the shaft 106, and that normally it can rotate relative to the inner thrust washer 190.

The gear 134 is adapted to be fixed to rotate with the shaft 106 by a clutch mechanism 222, which includes an annular clutch collar 224 received on the shaft 106 between the weight 128 and the shoulder 188, said collar having an external diameter corresponding to that of the thrust washer 190 and the hub 206. The clutch collar 224 has on the front thereof a pair of diametrically opposed, axially extending lugs or teeth 226. The outer peripheral surfaces of the lugs 226 are flush with the outer surface of the clutch collar 224, and the confronting inner surfaces thereof are spaced apart a distance slightly greater than the outer diameter of the needle bearing 192. The lugs 226 have a length slightly less than the combined lengths of the notches 212 and 214, and a width slightly less than the width of said notches.

The inner end of the clutch collar 224 has a threaded counterbore 228, within which is received a retainer ring 230. A coil spring 232 on the shaft 106 between the retainer ring 230 and the weight 128, functions to constantly urge the clutch collar 224 in a direction toward the gear hub 206. The collar 224 is slideable on the shaft 106 a distance sufficient to allow the lugs 226 to be disengaged from the notches 212 in the gear hub 206, whereby the gear 134 can be freed for rotation relative to the shaft 106, as is explained below. When the collar 224 is urged axially by the coil spring 232 to engage its lugs 226 within the notches 212 in the hub 206, the helical gear 134 carried by said hub will be keyed to rotate with the shaft 106; this keying results in part because the lugs 226 then also project through the notches 214 in the inner thrust washer 190, which is always fixed to rotate with the shaft 106 by the pins 220.

The shaft 106 has an axial bore 234 in the end thereof on which the gear 134 is mounted. The bore 234 extends inwardly to the region of the shoulder 188. A transverse rectangular slot 236 extends completely through the shaft 106 and intersects the inner end of the bore 234. The clutch collar 224 has a pair of diametrically opposed, internal axial grooves 238, FIG. 8, extending the length thereof, said grooves having a width corresponding to that of the slot 236. The grooves 238 have a radial depth equal to about one-fourth the radial thickness of the clutch collar 224, and are closed on one side, at their end nearest the weight 128, by the retainer ring 230.

A rectangular key bar 240 is received in the slot 236, and has its opposite ends extending into the grooves 238, whereby the clutch collar 224 is always keyed to the shaft 106. The bar 240 is of substantially less width than the axial length of the slot 236, and is freely slideable therein. The opposite end portions of the bar 240 are engaged by the retainer ring 130 when the clutch collar 224 has been moved axially to its full forward position on the shaft 106, and in which position the lugs 226 are engaged within the notches 212 in the hub 206 and in the notches 214 in the thrust washer 190. The slot 236, the bar 240, and the clutch collar 224 are designed dimensionally relative to each other so that when the bar 240 is in engagement with the rear wall 237 of the slot 236 (as will be described later), the clutch collar 224 will be positioned so that the lugs 226 are disengaged from the notches 212 in the hub 206, but are still partially disposed in the notches 214, whereby the thrust washer 190 is always drivingly interconnected with the clutch collar 224.

The cover plate 92, FIG. 7, has a central opening 242 therein aligned with the axial bore 234 in the shaft 106. The opening 242 has a counterbore 244 at its outer end. A seal assembly 246 is received within the counterbore 244 and is secured in position by a snap ring 248. A push rod 250 extends through the seal assembly 246 and the bore 242, and is slideably received within the axial bore 234. The push rod 250 is of a length such that its outer end projects substantially beyond the outer surface of the cover 92 when the inner end of said push rod is engaged with the transverse key bar 240.

It will be readily seen that by pushing the rod 250 inwardly, the key bar 240 will be caused to slide rearwardly within the slot 236 until it engages the wall 237 carrying the clutch collar 224 with it to disengage the lugs 226 from the hub notches 212, thereby disengaging the clutch mechanism 222. When the force urging the push rod 250 inwardly is removed, it will also be seen that the spring 232 will move the clutch collar 224 outwardly, which collar will carry the bar 240 and the push rod 250 therewith in its movement and re-engage the clutch.

The manner in which the clutch mechanism 222 operates to change the mode of vibration of the vibrator unit 56 from horizontal to vertical is as follows: With the weights 128 and 130 initially arranged as shown in FIG. 9, and with power being supplied to the shaft 100 from motor 172, the vibrator unit 56 will be operated to vibrate the table platform 18 in a horizontal mode. Upon pushing the rod 250 inwardly to disengage the lugs 226 from the notches 212, the driving connection between the gear 134 and the shaft 106 will be broken, and the shaft 106 will thus in effect "free-wheel." The helical gear 134, will, however, continue to rotate with the revolving drive gear 132 with which it is in mesh. The helical gear 134 will now rotate at a more rapid rate than the shaft 106 so that the notches 212 will advance ahead of the lugs 226. After the hub 206 has advanced sufficiently relative to the lugs 226 so that said lugs cannot re-enter the same notches from which they were just disengaged, pressure on the push rod 250 is released. This permits the spring 232 to urge the clutch collar 224 outwardly, whereby the lugs 226 will be resiliently urged against the end face of the hub 206. As the notches 212 continue to advance faster than the lugs 226, they again come into alignment with said lugs; but in the interim, the shaft 100 will have advanced 180° in its radial position relative to the shaft 106, whereby the weights 128 and 130 will be 180 degrees of their previous phase and assume the relative positions shown in FIG. 11. The result is that when the lugs 226 re-enter the notches 212, the vibrator unit 56 will have changed its mode of vibration from horizontal to vertical, and thereafter the table platform 18 will receive vertical vibrations.

The foregoing action occurs almost instantaneously, and requires only the time necessary for the gear 134 to be rotated 180° relative to the shaft 106.

The push rod 250 can be manually actuated as described above, but it is preferred to operate the rod 250 by a clutch operating mechanism 254, best shown in FIGS. 1–4, 6 and 7. The mechanism 254 is mounted on an inverted channel iron 256, which is secured to the floor directly in front of the push rod 250, by bolts 258. The channel iron 256 has a pair of upstanding ears 260 secured to the edge thereof closest to the vibrator unit 56. The lower end of a vertical arm portion 262 of an L-shaped lever 264 is pivotally secured between said ears by a pin 266. The upper end of the vertical arm 262 has a pad 268 welded thereto, which extends perpendicular to, and which confronts the outer end 252 of the push rod 250. The lever 264 further includes a horizontal arm portion 270, the outer end of which is disposed directly under a solenoid 272, which is secured by bolts 274 to a channel iron 276. The channel 276 is supported above the base 256 by standards 278. The solenoid 272 includes a movable core 280, which is pivotally connected to the outer end of the horizontal arm portion 270 by a link 282.

The solenoid 272 is supplied with electricity from a power supply 284 through leads 286 and 288 connected to the terminals 287 and 289 thereof. The lead 288 has a switch 290 and a conventional, adjustable time limit switch 292 connected therein in series. When the switch 290 is closed the solenoid 272 will be actuated, whereby the core 280 is moved upwardly carrying the outer end of the horizontal arm portion 270 therewith, causing the upper end of the vertical arm portion 262 to be moved inwardly to engage the pad 268 with the end 252 of the push rod 250, whereby the clutch mechanism 222 is operated to disengage the lugs 226 from the notches 212, as before described. As the horizontal arm portion 270 is moved upwardly, a projection 271 thereon engages a lever 273 on the switch 292, tripping it to open the circuit to the solenoid 272. When the circuit to the solenoid 272 is broken, the core 280 and the outer end of the horizontal arm portion 270 move downwardly, whereby the push rod 250 is freed for outward movement; this permits the spring 232 to move the clutch collar 224 outwardly to re-engage the lugs 226 with the notches 214 after the gear 134 has rotated 180° relative to the clutch collar 224.

The vibrator unit 54, FIG. 3, has a clutch mechanism 294 identical to the clutch mechanism 222, and includes an operating push rod 296. A clutch operating mechanism 298 is positioned to operate the push rod 296, and is identical in construction to the clutch operating mechanism 254. It is thus evident that the two interconnected vibrator units 54 and 56 can be actuated simultaneously to effect changing of the modes of vibration from horizontal to vertical, or vice versa, by closing their switches at the same time and while the vibration table 6 continues its operation. Obviously, and alternatively, the solenoid of the two vibrator units 54 and 56 could be connected in parallel in a circuit to be simultaneously energized by a single switch such as the switch 290.

The cushioned legs 22 are constructed to accommodate either vertical or horizontal vibration of the table platform 18, as well as the sudden change from one mode of vibration to another. It is thus seen that the vibration table 6 of the invention is constructed to change from one mode of vibration to another substantially without interruption, so that vibration of a concrete mixture disposed within a mold on the table platform 18 is continuous, thus insuring the making of a high quality product. The frequency of the vibrations is preferably 4200 per minute, and the amplitude $\frac{1}{16}$ inch. Both may be slightly varied more or less according to the requirements of the product being molded.

The framework 10 of the apparatus 2 is partially supported by the I-beams 12, and includes a pair of spaced, transversely extending I-beams 300, FIGS. 1, 2 and 3, which rest upon and are welded to the opposite ends of the I-beams 12. Vertical end plates 302 are welded to the end faces of I-beams 12 and extend upwardly to engage the I-beams 300, and are welded thereto.

Vertically disposed I-beams 304 are welded at their lower end to the opposite ends of the transverse I-beams 300, and are bridged at their upper end by transverse I-beams 306. Longer, vertical I-beams 308, FIG. 1, are secured to the floor 4 on either side of the vibration table 6 by anchor bolts 310, and are bridged at their upper ends by I-beams 312. The vertical I-beams 304 have a length sufficiently great so that the bridging I-beams 306 and 312 lie in a common plane.

As is best shown in FIG. 2, a pair of spaced, parallel I-beams 314 is welded to the underside of the transverse bridging I-beams 306 and 312, and the lower, horizontal flanges 316 thereof together define a pair of tracks extending from a point to the left of the vibration table 6, as viewed in FIG. 1, to a curing area (not shown).

A trolley or carrier frame 318 is mounted on the rail I-beams 314, and includes a pair of longitudinally extending I-beams 320 interconnected by transverse I-beams 322. Stub members 324 extend outwardly from the longitudinal beams 320, and have vertically projecting hangers 326 welded thereto. A wheel 328, having a flange 330 on the outer edge thereof, is rotatably mounted on a shaft 331 carried by the upper end of each plate 326, and rides on the lower flange 316 of the I-beam 314 associated therewith. Thus, the wheels 328 support the carrier frame 318, and enable it to be readily shifted from a position over the vibration table 6 to the curing area. It should be noted that a small clearance 332 of about one-eighth of an inch is present between the top of the carrier frame 318 and the bottom of the track I-beams 314 when the wheels 328 are resting on the flanges 316, the purpose of such clearance 332 being described hereinafter.

The mold assembly is supported by the platform table 18 of the vibration table 6, and includes an outer form 334 and an inner form 336. The construction of the mold 8 is best shown in FIGS. 9 to 13 to which reference is now made. The outer form 334 is in the nature of a rectangular metal box 342, which rests upon a pair of spaced, parallel I-beams 338 secured to the platform table 18 by bolts 340. The box 342 has side walls 344 and end walls 346 that slope inwardly from top to bottom. The lower longitudinal edges of the side walls 344 rest upon the upper face of the I-beams 338. Angle irons 348 are welded to the exterior of the side walls 344 and end walls 346 along their lower edge. Bolts 350 pass through the horizontal flange of the longitudinal angle irons 348 and the top flange of the I-beams 338, and detachably secure the box 342 in position.

Downwardly facing angle irons 352 are welded to the side walls 344 and end walls 346 along their upper outer edge and confront the angle irons 348. A plurality of spaced, vertically extending reinforcing ribs 354 are welded to the exterior of the box 342, the opposite ends of said ribs being welded to the angle irons 348 and 352. Resting upon the I-beams 338, and within the outer form 342 is a pallet 356, which forms the bottom wall of the outer form 334, but is not secured thereto, whereby it can be lifted out of said form, as described later. The pallet 356 has a pair of parallel, upwardly facing reinforcing channel members 358, FIG. 9, welded to the lower face thereof. The channel members 358 also serve as supports for the pallet when resting on a floor.

The inner form 336 is constructed to fit within the outer form 334 in spaced relationship thereto. The inner form 336 includes a pair of end walls 360, a pair of side walls 362, and a bottom wall 364, said walls 360, 362 and 364 being welded together at their adjoining edges. The end walls 360 and side walls 362 slope inwardly toward the bottom wall 364 to facilitate later removal from the molded product.

The inner form 336 further includes a top wall 366 having the general configuration of a hip roof, including a pair of inclined side plates 368 and a pair of inclined end plates 370, the plates 368 and 370 being welded together along their abutting edges, and being welded at their lower edges to the upper edges of the end walls 360 and the side walls 362. Disposed within the inner form 334 is a pair of spaced, transversely extending reinforcing plates 372, the peripheral edges of said plates having a configuration corresponding to the cross-sectional configuration of the inner form 336. The reinforcing plates have weight-reducing rectangular cutout openings 374 therein, and are welded in position at intervals as indicated at 375. The end walls 360 of the inner form 336 have vertical reinforcing ribs 376 similarly welded thereto at 377. Thus, the hollow inner form 336 is reinforced to withstand substantial external pressures.

A horizontal mounting plate 378 (FIG. 10) is welded within a cutout portion of the top wall 366 at each end thereof and adjacent to the juncture between the inclined top side plates 368 and the inclined top end plates 370. Secured to each mounting plate 378 is a resilient rubber cushion and lifting clevis assembly 380.

Each of the two clevis assemblies 380 includes an annular flange 382 welded to one of the mounting plates 378, and having the lower end of a resilient rubber cushion 384 received therein. An inverted, cup-shaped cover 386 overlies the top of each cushion 384, and has a pair of vertically extending ears 388 welded to the top surface thereof. The lower end 390 of a piston rod 392 of a hydraulic jack 394 is pivotally connected to each pair of ears 388 by a pin 396.

The I-beams 322 each have a pair of downwardly projecting ears 398, FIG. 2, welded thereon, and a pin 399 passes through each said pair of ears 398, and through the upper end of an associated hydraulic jack 394. The hydraulic jacks 394 are of the double acting type, and have fluid connections 395 and 397 at the upper and lower ends of their respective cylinders. It is to be noted from FIG. 1 that two hydraulic jacks 394 are utilized, one for each of the assemblies 380, and that when said jacks are extended the mold 8 will, in effect, be clamped between the resilient cushions 36 of the cushioned legs 22 and the resilient cushions 384 associated with the jacks 394.

Figure 10:
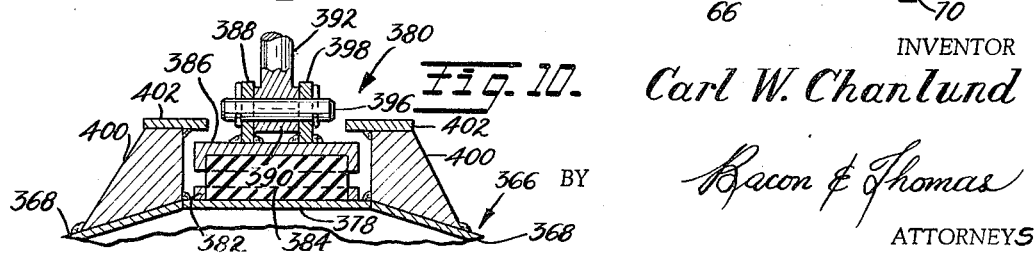
FIG. 10 is an enlarged fragmentary vertical sectional view, taken on the line 10—10 of FIG. 1, showing the construction of the resilient cushions disposed between the top of the mold and the hydraulic jacks for clamping the mold to the vibration table.

Welded to the top wall side plates 368, FIG. 10, on diametrically opposite sides of each of the cup-shaped covers 386 are upwardly extending webs 400. Welded to the upper ends of the webs 400 are horizontally extending plates 402, which extend inwardly to overlap with the diametrically opposite edges of their associated covers 386. The horizontal plates 402 are normally spaced vertically slightly from their associated covers 386, and will be engaged with said covers only when the hydraulic jacks 394 are operated to lift the inner form 336 from within the outer form 334.

The bottom wall 364 of the inner mold 336 has four holes 404 therein, one near each corner thereof. Each hole 404 is aligned with a hole 406, FIG. 12, in the pallet 356. The holes 406 in the pallet 356 are each intersected across its diameter by a slot 408, which has a length about three times the diameter of said holes.

The top wall side plates 368 have holes 410, FIG. 9, therein in alignment with the holes 404, and a cylindrical tube 412 is received within each set of aligned holes 404 and 410 and is welded in position. The tubes 412 each have an inwardly tapering, frusto-conical flange 414 on their lower ends, the lower face of which rests on the pallet 356 when the inner mold 336 is received within the outer mold 334 to properly space the bottom wall 364 from said pallet. The upper end 416 of the tubes 412 extends a short distance above the plates 368.

Received within each of the tubes 412 is a locking rod 418, the lower end 420 of which is tapered to facilitate its passage through the hole 406. The lower end of each rod 418 has a locking pin 422 passing diametrically therethrough, which pin is of a size to be easily passed through the slot 408. The upper end 424 of each rod 418 is threaded, and a key pin 426 passes diametrically through the upper end of each rod and projects from the opposite sides thereof.

A collar 428, having a handle 430 welded thereto, is received on the upper threaded end 424 of each rod 418 and rests on the upper end of the associated tube 412. The collars 428 have opposed axial grooves 432, FIG. 13, in the side walls thereof, within which the opposite ends of the key pins 426 are slidably received. A nut 434, having a handle 436 welded thereto, is received on the upper end of each rod 418 above the collar 428 thereon.

In use, the inner form 336 is first placed within the outer form 334, the locking pins 422 being oriented to pass through the slots 408. The two forms 334 and 336 are then secured together by swinging the handles 430 until the locking pins 422 are at right angles to the slots 408, as shown in FIG. 12, after which the nuts 434 are tightened by turning them with their handles 436 while simultaneously holding the collars 428 stationary by their handle 430. Disassembly of the forms 334 and 336 is accomplished by reversing the above assembly procedure.

Disposed to fit within the peripheral space between the upper end of the inner form 336 and the outer form 334 is a rectangular pressure form 438, FIGS. 9 and 11, comprising a horizontal plate 440 having a generally V-shaped groove 442 therein. The rectangular form 438 has pairs of upwardly extending ears 444 welded thereto medially of each of its side portions, which are utilized to connect it to a rectangular pressure frame 446.

The pressure frame 446 comprises four T-shaped members 448 welded together at their ends. The vertical legs of the latter members 448 are receivable between the ears 444 on the pressure form 438, and are detachably connected thereto by pins 450, which pass through aligned openings in said ears and said vertical legs. The upper face of the pressure frame 446 has pairs of upwardly extending ears 452 welded thereto near its four corners and on the opposite ends of the laterally extending, T-shaped members 448. The lower end of a piston rod 454, of hydraulic jacks 456 is received within each pair of ears 452, and is secured thereto by pins 458. The upper end of each hydraulic jack 456 is secured to the carrier frame 318 by brackets 460 and pins 462. Each hydraulic jack 456 is of the double acting type, and has operating fluid conduits 455 and 457 connected near the upper and lower ends thereof. The conduits 455 and 457 are interconnected for simultaneous operation of all of the jacks 456, as will be readily understood.

The operation of the apparatus 2 of the invention is as follows: After the inner form 334 has been placed within the outer form 316, and the rods 418 operated to secure said forms together, the hydraulic jacks 394 are operated to clamp the mold 8 between the resilient cushions 36 and 384. The vibrator units 54 and 56 are then started, and are initially arranged as in FIG. 9 to produce horizonal vibrations. The pressure applied by the jacks 394 is just sufficient to clamp the mold 8 in position without interferring with the vibratory motion being imparted thereto through the vibration table 6. A conveyor 464 is then extended over the mold 8, and a concrete mixture 466 is fed continuously onto the top wall 366 of the inner form 336, and vibrated along the top wall 366 and into the space between the outer and inner forms 334 and 336. The concrete mixture employed is preferably of the type known to the trade as a soil damp, or a no slump, mixture, and the horizontal vibrating action established by the vibrators 54 and 56 cause the concrete mixture to travel down the inclined top wall portions 368 and 370 to quickly settle into and be evenly distributed throughout said space. The horizonal vibration of the mold 8 will cause the concrete mix to compactly fill the space between the pallet 356 and the bottom wall 364 of the inner form 334. FIG. 9 shows the concrete mix starting to fill such space.

A predetermined quantity of concrete mixture 466, that is, enough to properly fill the mold 8 is fed by the conveyor 464, which is then stopped. The quantity may be measured, or gauged as the conveyor is operating, by the experience of the operator. The clutch mechanisms 222 and 294 are then operated to change the mode of vibration of the vibrator units 54 and 56 from horizontal to vertical, whereupon the resultant vertical vibrations compact the mix within the mold 8. With the vibrator units 54 and 56 still operating in their vertical modes, the pressure frame 446, having the pressure form 438 detachably connected thereto, is lowered by the hydraulic jacks 456, to the position shown in FIG. 11. The pressure form 438 is received within the space between the upper end of the outer form 334 and the inner form 346, and is forced downwardly by the four hydraulic jacks 456. Downward pressure by the hydraulic jacks 456 is maintained while the vibrators 54 and 56 continue operation in their vertical modes, until the concrete mixture 466 within the mold is properly distributed and compacted. At no time is the jack pressure on the pressure form 438 so great as to interfere with the proper vertical vibration of the mold 8.

It should be noted that when the hydraulic jacks 394 and 456 are extended against the mold components, the carrier frame 318 will be moved upwardly against the track I-beams 314 by reaction, whereby the slight clearance 332 will be eliminated. When the top surface of the frame 318 is in engagement with the bottom surfaces of the track I-beams 314, the wheels 328 will be disengaged from the flanges 316 and rendered ineffective, and the inner form 336 and the pressure form 438 will thus be held in position. The resilient cushions 36 and 384, between which the mold 8 is clamped, function to absorb shocks which would otherwise be transmitted from the vibration table 6 to the extended hydraulic jacks 394.

After the concrete mixture 466 has been sufficiently distributed and compacted, the vibrators 54 and 56 are turned off. The pins 450, connecting the pressure frame 466 to the pressure form 438, are then removed, and the pressure frame 446 is elevated by the hydraulic jacks 456. The molded product is self-sustaining due to the nature of the mix and its high density compacting, so that the hydraulic jacks 394 are then actuated to lift the inner form 336 vertically from within the outer form 334, together with the pallet plate 356, the molded concrete product, and the upper press form 438.

When the hydraulic jacks 456 are holding the pressure frame 446 above the mold 8, and after the hydraulic jacks 394 have been activated to lift the inner form 336, the wheels 328 will again come into contact with the lower flanges 316 of the track I-beams 314. Thereafter, the carrier frame 318 can be readily moved to the curing area.

The carrier frame 318, with its load attached, is then shifted to the curing area, where the hydraulic jacks 394 are actuated to lower the pallet plate 356 to rest with the channels 358 engaging the floor or other support. The rods 418 are then operated to align locking pins 422 with the slots 408, and the inner form 336 is removed from the molded product. The pressure form 438 is also removed, and these elements can again be utilized within the outer form 434 to produce another concrete product. The pallet 356 will normally remain in place until the concrete product resting thereon is completely cured and can be removed therefrom. Other pallets 356 can be successively inserted into the outer form 334 to continue the molding operations.

The two-way vibration table 6 is of major importance to insure that the concrete mixture utilized to manufacture a product will be thoroughly distributed and properly compacted within the mold. The use of the two vibrator units 54 and 56, which are driven by separate motors and maintained in synchronous operation by the sprocket gears 140 and 142 and the toothed belt 144, provide controlled vibration over the entire length of the vibration table 6. Further, the vibrator units 54 and 56 can be changed while operating from a horizontal to a vertical vibration mode, and vice versa. It is also apparent that the units 54 and 56 could easily be designed for vibration in other directions. In addition, depending on the size of the vibration table and the weight of the product to be molded, any number of vibrator units can be mounted on a single vibration table.

The apparatus 2 readily lends itself to the large scale production of molded articles, the unique combination of forms, the mold handling equipment, and the vibrating table insuring that all products will have the same desired physical characteristics. The hydraulic jacks 394 and 456 are positioned for dual use, in that they both position and handle the mold components, and also provide pressure in cooperation with the vibration table 6 to distribute and compact the concrete mixture within the mold 8. It will be apparent that the rail beams 314 may extend any desired distance, in one or both directions from the table 6, to extend over any desired length of curing area.

Obviously, many modifications and variations of the present invention are possible in the light of the above teachings. It is, therefore, to be understood that within the scope of the appended claims, the invention may be practiced otherwise than as specifically described.

I claim:

1. Apparatus for producing a molded product, comprising: a base; a vibration table for supporting a mold; means mounting said vibration table on said base, and arranged so that said table can vibrate in substantially any direction relative to said base; vibrator means secured to said vibration table and being operable in any selected one of a plurality of modes of vibration to vibrate said table, each operating mode of said vibrator means producing a direction of vibration different from that produced by the remainder of said plurality of modes; and control means arranged to coact with said vibrator means, and operable to change the mode of vibration of said vibrator means while the same is operating to vibrate said table.

2. Apparatus as recited in claim 1, wherein the vibrator means includes: a pair of shafts mounted for rotation about their longitudinal axes, each of said shafts having eccentric weight means fixed thereto; and means for interconnecting said shafts to effect simultaneous rotation thereof in opposite directions, including; an element rotatably mounted on one of said shafts and drivingly connected with the other of said shafts, whereby rotation of said other shaft will effect rotation of said element; and a clutch carried by said one shaft and engageable with said element to drivingly connect said element to said one shaft in any selected one of a plurality of different relative radial positions, said vibrator means producing one of said modes of vibration in each of said radial positions when said shafts are simultaneously rotated in opposite directions.

3. Apparatus as recited in claim 2, wherein the control means for the vibrator means operable to change the mode of vibration thereof while said vibrator is operating includes: a solenoid; and means operatively connecting said solenoid with said clutch, and operable when said solenoid is energized to actuate said clutch to effect shifting of said element from one radial position to another radial position relative to said one shaft.

4. Apparatus for producing a molded product, comprising a base; a vibration table for supporting a mold; means mounting said vibration table on said base, and designed so that said table can vibrate in substantially any direction relative to said base; vibrator means secured to said vibration table and designed to be operable in any selected one of a plurality of modes of vibration to vibrate said table accordingly, each operating mode of said vibrator means producing a different direction of vibration from that produced by the remainder of said plurality of modes, said vibrator means including: a pair of shafts mounted for rotation about their longitudinal axes, each shaft having eccentric weight means fixed thereon; and means operable to selectively interconnect said shafts in any one of a plurality of relative radial positions to rotate simultaneously in opposite directions, said eccentric weight means on said pair of shafts being arranged differently relative to each other in each of said radial positions, and producing one of said modes of vibration in each said radial position when said shafts are simultaneously rotated; and control means arranged to coact with the means interconnecting said shafts, and operable while said vibrator means is operating to effect changing of the connection between said shafts from one of said relative radial positions to another.

5. Apparatus as recited in claim 4, wherein the means operable to selectively interconnect said shafts include: a first gear fixed to one of said shafts; a second gear rotatably mounted on the other of said shafts and meshing with said first gear; and clutch means carried by said other shaft and engageable with said second gear to connect said second gear to said other shaft with said shafts disposed in any selected one of said plurality of relative radial positions.

6. Apparatus as recited in claim 5, wherein the means operable to effect changing of the connection between said shafts while said vibrator means is operating includes: a solenoid; and means interposed between said solenoid and said clutch, operable when said solenoid is energized to actuate said clutch to effect shifting of said shafts from one of said relative radial positions to another of said radial positions.

7. A vibrator unit operable in any selected one of a plurality of modes of vibration, including: a housing; a pair of substantially parallel, spaced shafts mounted for rotation at their opposite ends in bearings carried by said housing, each of said shafts having eccentric weight means fixed thereon; and means operable while said shafts are rotating to selectively interconnect said shafts for simultaneous rotation in opposite directions in any one of a plurality of relative radial positions, said eccentric weight means on said pair of shafts being arranged differently relative to each other in each of said radial positions, and when simultaneously rotated producing vibration in each said radial position in a direction different from the direction of vibration produced when said shafts are in the remainder of said plurality of radial positons.

8. A vibrator unit as recited in claim 7, wherein the means to selectively interconnect the shaft includes: a first gear fixed on one of said shafts; a second gear rotatably mounted on the other of said shafts and meshing with said first gear; and a clutch mounted on said other shaft, including: a hub carrying said other gear and having a plurality of notches; a clutch collar slidably mounted on said other shaft and having at least one projecting tooth selectively receivable within said notches, said clutch collar being movable toward and away from said hub to engage and disengage said tooth with one of said notches; means keying said clutch collar to said other shaft to rotate therewith; resilient means carried by said other shaft arranged to urge said clutch collar toward said hub to engage said tooth in one of said notches; and means including a push rod carried by said other shaft operable to move said clutch collar away from said hub for disengaging said tooth from its associated notch.

9. A vibrator unit as recited in claim 8, wherein the other shaft has an axial bore in one end thereof extending to the region of said clutch collar, and a transverse slot extending through said other shaft in the region of said clutch collar and intersecting said axial bore, and wherein the means keying said clutch collar to said other shaft includes a bar received within said transverse slot and connected at its opposite ends to said clutch collar, said bar being slidable within said transverse slot, and wherein the push rod is partially received within said axial bore, one end of said push rod being engageable with said bar, and the other end of said push rod projecting beyond the end of said other shaft.

10. Apparatus for producing a molded product, comprising: a base; a vibration table for supporting a mold; cushioned leg means mounting said vibration table on said base and designed so that said table can vibrate in substantially any direction relative to said base; at least one vibrator unit secured to said table and designed to be operable in either a horizontal mode of vibration or a vertical mode of vibration to selectively impart either horizontal or vertical vibrations, respectively, to said vibration table, said vibrator unit including: a housing, a pair of substantial parallel spaced shafts rotatably mounted at their opposite ends in bearings carried by said housing, and each having eccentric weight means fixed thereon; and means operable to selectively interconnect said shaft in any one of a plurality of relative radial positions to rotate simultaneously, said eccentric weight means on said pair of shafts being arranged differently relative to each other in each of said radial positions, and producing one of said modes of vibration in each said radial position when said shafts are simultaneously rotated, said means operable to selectively connect said shafts including: a first gear fixed to one of said shafts; a second gear rotatably mounted on the other of said shafts and meshing with said first gear; and a clutch carried by said other shaft and engageable with said other gear to connect said other gear to said other shaft in any selected one of a plurality of different relative radial positions; and control means arranged to coact with said vibrator unit operable to change the direction of vibration thereof while said vibrator unit is operating.

11. Apparatus as recited in claim 10, wherein the control means which coacts with the vibrator unit to change the mode of vibration thereof includes: a solenoid; and means operatively connecting said solenoid with said clutch, and operable when said solenoid is energized to disengage said clutch from said other gear.

12. Apparatus as recited in claim 10, including a pair of substantially identical vibrator units secured to said table, each designed to be operable to selectively impart either horizontal or vertical vibrations to said vibration table, and wherein said control means is arranged to coact with both of said vibrator units, and is operable to simultaneously change the direction of vibration of said vibrator units while said vibrator units are operating.

13. A vibration table, comprising: a base; a platform table; a plurality of cushioned legs mounting said table on said base, and designed so that said table can vibrate in substantially any direction relative to said base; at least one vibrator unit secured to said table and designed to be operable in any selected one of a plurality of modes of vibration to vibrate said table, each operating mode of said unit producing a direction of vibration different from that produced by the remainder of said plurality of modes, said vibrator unit including: a housing; a pair of substantially parallel shafts rotatably mounted at their opposite ends in bearings carried by said housing, each of said shafts having eccentric weight means thereon; a first gear fixed on one of said shafts; a second gear rotatably mounted on the other of said shafts and meshing with said first gear to effect simultaneous rotation of said shafts; clutch means mounted on said other shaft, and operable to selectively connect said second gear to said other shaft in any one of a plurality of relative radial positions of said second gear with respect to said second shaft; and means including a push rod engageable with said clutch means for disengaging said clutch means from said second gear; a motor connected to one of said shafts to rotate the same; and means engageable with said push rod and being operable to actuate said push rod to effect disengagement of said clutch means from said second gear while said other shaft is being rotated.

14. A vibration table as recited in claim 13, wherein said other shaft has a transverse slot extending therethrough in the region of said second gear, and has an axial bore in one end thereof intersecting said slot, and wherein the clutch means includes: a hub carried by said second gear having a plurality of notches therein; a clutch collar slidably mounted on said other shaft, and having at least one tooth thereon engageable with any one of said notches in said hub; a key bar received within said transverse slot and slidable axially of said other shaft, said key bar being engaged at its opposite ends with said clutch collar to key said clutch collar to rotate with said other shaft; and resilient means arranged to urge said clutch collar toward said hub to engage said tooth within one of said notches; and wherein said push rod is at least partially received within said axial bore, the inner end of said push rod being engageable with said key bar, and the outer end thereof projecting from said other shaft.

15. A vibration table as recited in claim 14, wherein the means for operating the push rod comprises: a lever pivotally mounted relative to said base and engageable with the outer end of the push rod; a solenoid having a core connected with said lever, said solenoid and said lever being arranged so that when said solenoid is energized, said lever will move said push rod to disengage said tooth from said notches.

16. A vibration table as recited in claim 15, wherein the hub includes at least one pair of notches, spaced 180 degrees apart, and wherein the clutch collar includes at least one pair of teeth, spaced 180 degrees apart, and wherein the solenoid is connected into an electrical circuit, including: a manually operable control switch and a normally closed time delay switch connected in service, and wherein the time delay switch is arranged to be opened by the lever as it is actuated by the solenoid core.

References Cited by the Examiner

UNITED STATES PATENTS

| 1,574,985 | 3/1926 | McWain | 25—41 |
| 1,675,560 | 3/1928 | Jubien. | |
| 2,106,329 | 1/1938 | Scott | 25—41 |
| 2,407,168 | 9/1946 | Lindvist | 25—41 |
| 2,695,523 | 10/1946 | Oswalt | 25—41 XR |

FOREIGN PATENTS

| 922,389 | 6/1947 | France. |

WILLIAM J. STEPHENSON, *Primary Examiner.*